(12) United States Patent
Zou et al.

(10) Patent No.: US 10,762,207 B2
(45) Date of Patent: Sep. 1, 2020

(54) METHOD AND DEVICE FOR SCANNING VIRUS

(71) Applicant: BAIDU ONLINE NETWORK TECHNOLOGY (BEIJING) CO., LTD., Beijing (CN)

(72) Inventors: Rongxin Zou, Beijing (CN); Zhu Xiang, Beijing (CN); Yinming Mei, Beijing (CN); Xudong Fu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 161 days.

(21) Appl. No.: 15/504,297

(22) PCT Filed: Sep. 14, 2015

(86) PCT No.: PCT/CN2015/089517
§ 371 (c)(1),
(2) Date: Feb. 15, 2017

(87) PCT Pub. No.: WO2016/169189
PCT Pub. Date: Oct. 27, 2016

(65) Prior Publication Data
US 2018/0039778 A1 Feb. 8, 2018

(30) Foreign Application Priority Data
Apr. 22, 2015 (CN) .......................... 2015 1 0192621

(51) Int. Cl.
*G06F 21/56* (2013.01)
(52) U.S. Cl.
CPC ............ *G06F 21/565* (2013.01); *G06F 21/56* (2013.01); *G06F 21/562* (2013.01); *G06F 21/566* (2013.01); *G06F 2221/033* (2013.01)

(58) Field of Classification Search
CPC ...... G06F 21/565; G06F 21/566; G06F 21/56; G06F 21/562; G06F 2221/033
See application file for complete search history.

(56) References Cited

U.S. PATENT DOCUMENTS

| | | | |
|---|---|---|---|
| 7,774,451 B1 | 8/2010 | Bogorad et al. | |
| 8,087,084 B1 | 12/2011 | Andruss et al. | |
| (Continued) | | | |

FOREIGN PATENT DOCUMENTS

| | | | |
|---|---|---|---|
| CN | 102905269 A | 1/2013 | |
| CN | 103207970 | 7/2013 | |
| (Continued) | | | |

OTHER PUBLICATIONS

International Search Report from Application No. PCT/CN2015/089517 dated Feb. 2, 2016 (2 pgs).

*Primary Examiner* — Farid Homayounmehr
*Assistant Examiner* — Suman Debnath
(74) *Attorney, Agent, or Firm* — Knobbe, Martens, Olson & Bear, LLP

(57) ABSTRACT

The present application discloses a method and a device for scanning virus. The method for scanning virus comprises: ascertaining first scanning items in a client based on a determination to perform an intelligent scan; scanning the first scanning items at a first scanning speed; and scanning second scanning items in the client at a second scanning speed based on the client satisfying a first switching condition, the second scanning items are all remaining items except the first scanning items in the client, wherein the first scanning speed is higher than the second scanning speed. According to the scheme of the present application, adverse effects of virus scanning on a user's normal operation on and use of the client can be reduced.

20 Claims, 5 Drawing Sheets

(56) References Cited

U.S. PATENT DOCUMENTS

| | | | |
|---|---|---|---|
| 8,533,834 B1* | 9/2013 | Wong | H04L 63/14 709/217 |
| 9,141,794 B1* | 9/2015 | Soubramanien | G06F 1/329 |
| 2007/0079377 A1* | 4/2007 | Pagan | G06F 21/562 726/24 |
| 2014/0090062 A1 | 3/2014 | Guo | |
| 2015/0020203 A1* | 1/2015 | Xie | G06F 21/56 726/24 |

FOREIGN PATENT DOCUMENTS

| | | |
|---|---|---|
| CN | 103336925 | 10/2013 |
| CN | 103679022 | 3/2014 |
| CN | 104063662 | 9/2014 |
| CN | 104778411 | 7/2015 |
| WO | WO 2013/014033 | 1/2013 |
| WO | WO 2014/048203 A1 | 4/2014 |

\* cited by examiner

METHOD AND DEVICE FOR SCANNING VIRUS

CROSS-REFERENCE TO RELATED APPLICATIONS

This application is a U.S. national phase of PCT/CN2015/089517, filed on Sep. 14, 2015, which claims the benefit of Chinese Patent Application No. 201510192621.9, entitled "-Method and Device for Scanning Virus," filed on Apr. 22, 2015, of each of which is hereby incorporated by reference in its entirety.

TECHNICAL FIELD

The present invention generally relates to the computer technology, particularly to virus scanning technology, and more particularly to a method and device for scanning virus.

BACKGROUND

Computer virus scanning techniques generally include a full scan which scans all items in a computer. During the full scan, in order to achieve the goal of completing the scan as soon as possible, a large portion of the computer hardware resource will typically be occupied.

However, as the computer software and hardware develop, the number of system files in a computer operating system is increasing, so are various software applications. When a conventional computer virus scan technique is deployed to fully scan a computer operating system, the required scan time is increasingly longer.

Furthermore, since the scan process using the existing computer virus scanning techniques occupies the computer hardware resources to a relatively large extent, a user's normal computer operation and use is noticeably affected, thus causing inferior user experience.

The conventional art discloses a scan acceleration method and device, whereby only modified files in the computer are scanned through an enumeration approach, enabling an accurate determination of the modified files. Not only can a scan operation on safe files be skipped, but also the possibility of missing viruses and Trojan horses through a lightweight check is avoided.

The above mentioned scan acceleration technique can only scan the modified files by enumeration. However, computer viruses are not only present in the modified files, but may also be widely present in other parts of the computer. Furthermore, the enumeration approach causes relatively low efficiency and fails to rapidly obtain the content which needs to be scanned in the computer.

SUMMARY

In view of the defects or shortcomings in the prior art, there is a need to provide a method and a device for scanning virus, which can be used for performing fast scan on a computer efficiently, but consume fewer system resources.

In a first aspect, one embodiment of the present application provides a method for scanning virus, which comprises: ascertaining first scanning items in a client based on a determination to perform an intelligent scan; scanning the first scanning items at a first scanning speed; and scanning second scanning items at a second scanning speed based on the client satisfying a first switching condition, the second scanning items are all remaining items except the first scanning items in the client.

In a second aspect, another embodiment of the present application further provides a method for scanning virus, which comprises: configuring scanning items in the client, wherein the scanning items include first scanning items and second scanning items; initiating a first scan on the first scanning items in the client, the first scan has a first scanning speed; wherein the configuring the scanning items in the client comprises: counting a ratio of items infected by a virus in a plurality of clients, wherein the plurality of clients are clients connected to a given server via a network; and assigning the items having the ratio higher than a predetermined ratio as the first scanning items, and remaining items as the second scanning items.

In a third aspect, one embodiment of the present application further provides a device for scanning virus, which comprises: an ascertaining module configured to ascertain first scanning items in a client based on a determination to perform an intelligent scan; a first scanning module configured to scan the first scanning items at a first scanning speed; and a second scanning module configured to scan second scanning items in the client at a second scanning speed based on the client satisfying a first switching condition, the second scanning items are all remaining items except the first scanning items in the client.

In a fourth aspect, another embodiment of the present application further provides a device for scanning virus, which comprises: a configuration module configured to configure scanning items in the client, wherein the scanning items include first scanning items and second scanning items; a first scanning module configured to initiate a first scan on the first scanning items in the client, the first scan has a first scanning speed; wherein the configuration module is specifically used to: count a ratio of items infected by a virus in a plurality of clients, wherein the plurality of clients are clients connected to a given server via a network; assign the items having the ratio higher than a predetermined ratio as the first scanning items, and items having the ratio being not higher than the predetermined ratio as the second scanning items.

According to the method and device for scanning virus provided by the embodiments of the application, since the second scanning speed is lower than the first scanning speed, when the second scanning items in the client are subjected to virus scanning at the second scanning speed, adverse affects of virus scanning on a user's normal operation on and use of the client can be reduced.

In some embodiments, since the items having high probabilities of containing viruses are considered as the first scanning items, and the first scanning items are preferentially and fast scanned, therefore the possibility that viruses are detected fast is increased.

BRIEF DESCRIPTION OF THE DRAWINGS

Other features, objectives and advantages of this application will become more apparent upon reading the detailed description of the non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
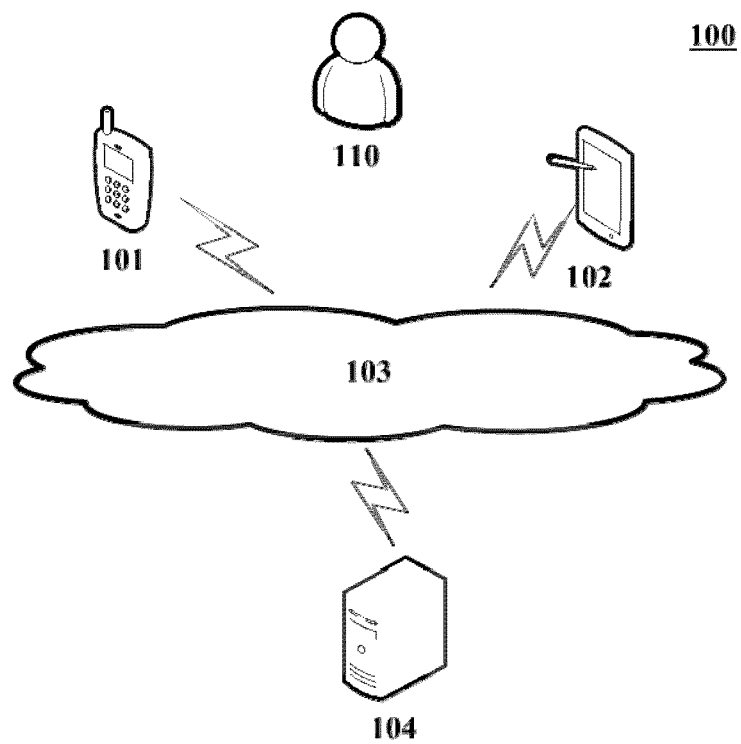
FIG. 1 illustrates an exemplary system architecture 100 in which embodiments of this application may be applied.

FIG. 1 illustrates an exemplary system architecture 100 in which one embodiment of this application may be applied.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

The user 110 may use the terminal devices 101 and 102 to interact with the server 104 through the network 103, in order to transmit or receive messages, etc. Various communication client applications, such as instant messaging tools, mailbox clients, social platform software, antivirus application etc. may be installed on the terminal devices 101 and 102.

The terminal devices 101 and 102 may be various electronic devices including but not limited to, personal computer, smart phones, smart watch, tablet computers and personal digital assistant.

The server 104 may be a server that provides various services. The server 104 may be used for processing (such as storing and analyzing) received data and feeding back the processing result to the terminal devices. In the embodiments of the present application, the server 104 may be, for example, a virus detecting and removing server and used for launching virus scanning on terminal devices 101 and 102.

It should be appreciated that the numbers of terminal devices, networks and servers in FIG. 1 are merely illustrative. Any number of terminal devices, networks and servers may be provided according to the actual requirements.

Figure 2:
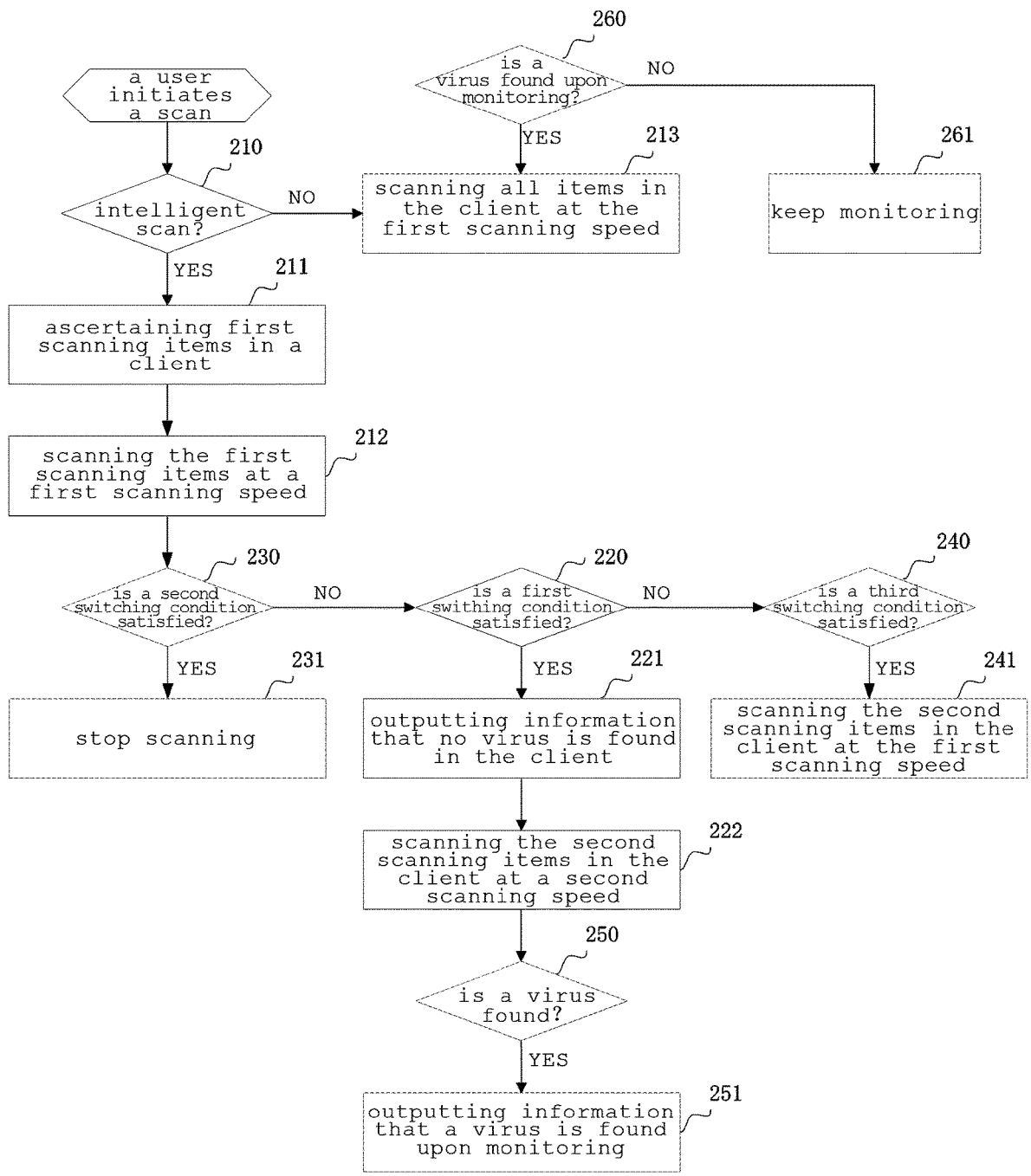
FIG. 2 illustrates a schematic flowchart of a virus scanning method according to an embodiment of the present application.

FIG. 2 illustrates a schematic flowchart of a virus scanning method 200 according to an embodiment of the present application.

As illustrated in FIG. 2, when a user initiates virus scanning, at steps 210 and 211, first scanning items in a client are determined based on a determination to perform an intelligent scan. Here, in one implementation, whether to execute the intelligent scan may be determined based on a user's selection, or may also be determined based on a historical result of virus scanning in the client.

Here, the first scanning items may be items being subjected to scanning preferentially in the client. The first scanning items may include file items (for example, various documents) and non-file items (for example, registry, process, etc.).

In some implementations, the first scanning items may be designated by a user, and it may be also decided whether each item in a computer belongs to the first scanning items based on a preset rule.

For example, in some implementations, currently operating items in a client may be considered as the first scanning items. Furthermore, items each of which a historical number of times of virus infection is higher than a predetermined number of times of infection may also be considered as the first scanning items by counting the historical number of times of virus infection of all items in a client. Here, the predetermined number of times of infection may be any preset natural number.

When a client is connected to Internet, typically computer viruses are likely to attack the currently operating items in the client and infect the same. When being considered as the first scanning items, these currently operating items may be preferentially scanned, and when there is an item infected by the viruses among the currently operating items, the item infected by the viruses can be found as soon as possible.

Similarly, the items each of which the historical number of times of virus infection is higher than the predetermined number of times of infection are considered as the first scanning items, and in order to find out the items infected by viruses in the client as soon as possible, this part of items may also be preferentially scanned.

Next, at step 212, the first scanning items are scanned at a first scanning speed. The first scanning speed may be, for example, determined in advance based on at least one of the followings: hardware configuration (for instance, the memory size of a computer) in the client; an expected ratio of client resources occupied by virus scanning; and an expected time required for completing a first scan. For example, if it is expected to complete the first scan of the first scanning items within two minutes, the specific value of the first scanning speed may be set on this basis.

Next, at steps 220 and 222, scanning second scanning items at a second scanning speed based on the client satisfying a first switching condition, the second scanning items being all remaining items except the first scanning items in the client. Here, the first scanning speed is higher than the second scanning speed.

Similar to the first scanning speed, the second scanning speed may be, for example, pre-determined based on at least one of the followings: hardware configuration (for instance, the memory size of a computer) in the client; an expected ratio of the client resources occupied by virus scanning; and an expected time required for completing a second scan. For example, if it is expected to complete the second scan of the second scanning items within five minutes, a specific value of the second scanning speed may be set on this basis.

Because the second scanning speed is lower than the first scanning speed, when the second scanning items are scanned, the ratio of occupied resources in the client correspondingly decreases. In this way, adverse effects (for instance, the operating speed of operating programs designated by a user in the client and/or the speed of responding to a certain input instruction of a user) of virus scanning on normal operation of the user and the use of the client are/is reduced when the second scanning items are scanned at the second scanning speed, in comparison to the case where the first scanning items are scanned at the first scanning speed.

Furthermore, as the first scanning items include items having a relatively high virus-infecting probability in the client, at the step of scanning the first scanning items at the first scanning speed, the probability of finding a virus is also higher than that of a virus scanning technology in the prior art, and meanwhile, the probability of detecting a virus fast is also increased.

In some implementations, at step 222, the scan on the second scanning items at the second scanning speed may be executed in a manner invisible to a user, such as background scan, so as to relieve a user's concern about the virus scanning process.

After a user initiates scanning, in the event that an intelligent scan is not executed, all items in the client are scanned at a same speed (for example, at the first scanning speed, respectively), in a manner similar to the existing virus scanning techniques.

In some implementations, the first switching condition may be, for example: no virus found in the first scanning items; a frequency for scanning virus not exceeding a first predetermined value, and a historical infection rate of the second scanning items being lower than a second predetermined value.

Here, the first predetermined value and the second predetermined value may be preset, and have no specific relationship in size. That is, the first predetermined value may be lower than, higher than or equal to the second predetermined value.

In some implementations, after step 212 of scanning the first scanning items at the first scanning speed is completed, the virus scanning method may further comprise: outputting information that no virus is found in the client based on the client satisfying the first switching condition (steps 220 and 221).

In some implementations, if a virus is found at step 222 where the second scanning items in the client are scanned at the second scanning speed, outputting information that a virus is found upon monitoring (steps 250 and 251).

When the second scanning items in the client are scanned at the second scanning speed, a user's normal operation on the client may not be affected basically. In addition, in case that a virus is detected, the information that a virus is found upon monitoring is sent timely so as to warn a user.

The information that a virus is found upon monitoring may be, for example, displayed on the client in a popup form such that a user notices the information timely. The virus scanning method of this embodiment may further comprise: stopping scanning and outputting information that no virus is found in the client based on the second switching condition being satisfied (steps 230 and 231).

In some cases, it may be determined that the probability that a virus is contained in the second scanning items is very low based on a scanning result of the first scanning items or other historical scanning results, meanwhile, after the scan of the first scanning items is completed, the second scanning items may not be scanned to further save computer resources.

In some implementations, the second switching condition may, for example include: no virus found in the first scanning items; and a historical infection rate of the second scanning items being lower than a third predetermined value. In these embodiments, it can be considered that, if the second scanning items are subjected to virus scanning, the probability that a virus may be found is extremely low, and therefore, in such a case, the second scanning items may not be scanned.

In some implementations of this method, it may be decided first whether the client satisfies the second switching condition (step 230), and if not, then it is decided whether the client satisfies the first switching condition (step 220). In this way, if the client satisfies both the first switching condition and the second switching condition, because it is decided first whether the second switching condition is satisfied, virus scanning on the client may be stopped as long as the second switching condition is satisfied regardless of whether or not the first switching condition being satisfied (step 231).

The virus scanning method of this embodiment may further comprise: scanning the second scanning items in the client at the first scanning speed based on a third switching condition is satisfied (steps 240 and 241).

In some cases, it is necessary to perform fast full scan on the client to find all viruses as soon as possible, meanwhile, this purpose may be achieved by scanning the second scanning items at a scanning speed which is the same as the scanning speed at which the first scanning items are scanned.

In some implementations, the third switching condition may include at least one of the followings: a virus found in the first scanning items; and the frequency for scanning virus being higher than a first predetermined value.

In some cases, when the first scanning items are scanned at the first scanning speed, it may be considered that the client is infected by viruses if a virus is found in one or more first scanning items, and all the viruses need to be detected as soon as possible. Therefore, the case in which a virus is found in the first scanning items may be considered as one item of the third switching condition. When this condition is satisfied, the second scanning items are scanned at the first scanning speed.

In some other cases, it is possible for a user to initiate scan multiple times within a short time, and meanwhile, it may be considered that the user hopes to verify that no virus is present in the client by scanning multiple times, or to verify that viruses found in previous scan have been removed. It may be considered that the user tends to scan all items in the client as soon as possible. Therefore, the case in which the frequency for scanning virus is higher than the first predetermined value may be considered as one item of the third switching condition, and when this condition is satisfied, the second scanning items are scanned at the first scanning speed.

The virus scanning method of this embodiment may further comprise: scanning all items in the client at the first scanning speed on the basis that a virus is found upon monitoring (steps 260 and 213).

If a virus is found in the monitoring process, it may be considered that all items need to be scanned as soon as possible to obtain all viruses, and therefore, all items are scanned at a faster first scanning speed.

On the contrary, if no virus is found upon monitoring, continuing to keep virus monitoring with respect to the client (step 261).

Figure 3:
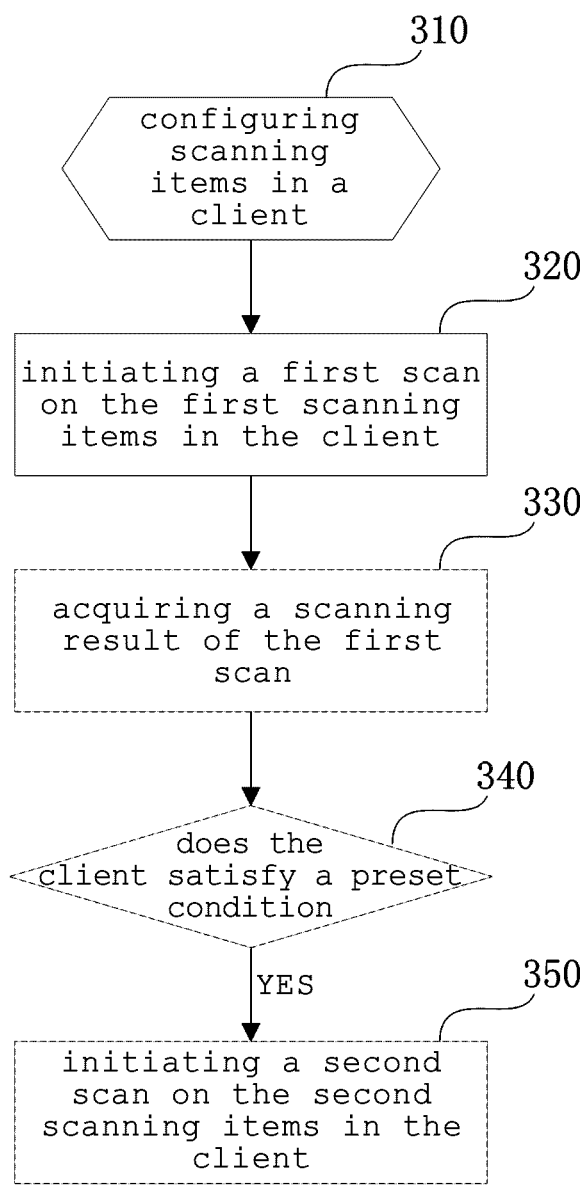
FIG. 3 illustrates a schematic flowchart of a virus scanning method according to another embodiment of the present application.

FIG. 3 illustrates a schematic flowchart of a virus scanning method 300 according to another embodiment of this application.

As illustrated in FIG. 3, at step 310, scanning items in the client are configured, wherein the scanning items include the first scanning items and the second scanning items.

At step 320, a first scan is initiated on the first scanning items in the client, wherein the first scan has a first scanning speed.

In some implementations, the first scan may be, for instance, initiated on the first scanning items in the client based on a user's input, or the first scan may also be initiated on the first scanning items in the client at a predetermined time interval.

In some implementations, step 310 of configuring the scanning items in the client may, for instance, comprise: counting a ratio of items infected by a virus in a plurality of clients; assigning the items having the ratio higher than a predetermined ratio as the first scanning items, and remaining items as the second scanning items. Here, the plurality of clients are clients connected to a given server via a network.

Preferably, in addition to configuring the scanning items in the client and initiating the first scan on the first scanning items in the client, the method for scanning virus of this embodiment may further comprise: determining whether to perform virus scanning on the second scanning items in the client according to specific conditions of the client.

To be specific, at step 330, a scanning result of the first scan is acquired.

The scanning result, may, for example, comprise at least one of the followings: whether the first scanning items contain viruses; which one or which ones of first scanning items contain viruses; the probability that viruses are found in the first scanning items in the virus scanning history; and the probability that viruses are found in a certain specific item in the virus scanning history.

At steps 340 and 350, a second scan is initiated on the second scanning items in the client on the basis that the client satisfies a preset condition, wherein the first scanning speed is larger than the second scanning speed. The second scan has a second scanning speed. The first scanning speed is higher than the second scanning speed.

In some implementations, the scan on the second scanning items at the second scanning speed may be executed in a manner invisible to a user, such as background scan, so as to relieve a user's concern about the virus scanning process.

In some implementations, the preset condition may be, for example, no virus found in the first scanning items, a frequency for scanning virus at which the first scan is initiated not exceeding a predetermined frequency and a historical infection rate of the second scanning items being lower than a predetermined infection rate.

It should be noted that, as illustrated in the system architecture in FIG. 1, the virus scanning method provided by embodiments of the present application may be executed by terminal devices 101 and 102 or by a server 104; and the virus scanning device may be provided in the terminal devices 101 and 102, or in the server 104.

In some implementations, a number of steps of the virus scanning method may be executed in the server 104, or may be executed in the terminal devices 101 and 102. For instance, when the first scanning items are scanned at the first scanning speed, if the terminal devices do not possess processing capacity, the first scanning items in the terminal devices may be scanned by the server 104; and if the terminal devices 101 and 102 have the processing capacity, the first scanning items may be scanned by the terminal devices 101 and 102 directly.

Figure 4:
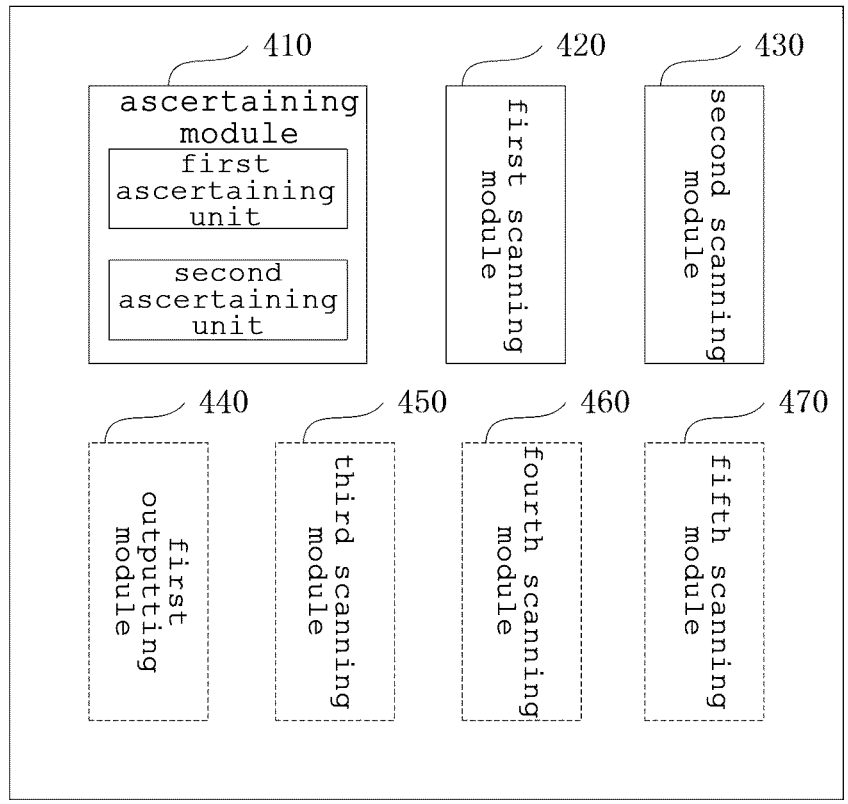
FIG. 4 illustrates a schematic structural diagram of a virus scanning device according to an embodiment of the present application.

FIG. 4 illustrates a schematic structural drawing of a virus scanning device 400 according to embodiments of this application.

As illustrated in FIG. 4, the virus scanning device 400 comprises a ascertaining module 410, a first scanning module 420 and a second scanning module 430. The ascertaining module 410 is configured to ascertain the first scanning items in the client based on a determination to perform an intelligent scan. The first scanning module 420 is configured to scan the first scanning items at a first scanning speed. The second scanning module 430 is configured to scan the second scanning items at the second scanning speed on the basis that the client satisfies a first switching condition, the second scanning items are all remaining items except the first scanning items in the client. Here, the first scanning speed is higher than the second scanning speed.

In some implementations, the ascertaining module 410 comprises at least one of the following units:

a first determination unit 411 configured to assign a currently operating item in the client as the first scanning items; and a second determination unit 412 configured to count a historical number of virus infection occurrences for items in the client, and consider items having the historical number infection occurrences being higher than a predetermined number of infection occurrences as the first scanning items.

In some implementations, the first switching condition may be, for example: no virus found in the first scanning items; a frequency for scanning virus not exceeding a first predetermined value; and a historical infection rate of the second scanning items being lower than a second predetermined value.

Preferably, the virus scanning device 400 of this embodiment may further comprise a first outputting module 440 configured to, after the first scanning module scans the first scanning items at the first scanning speed, output information that no virus is found in the client on the basis that the client satisfies the first switching condition.

Preferably, the second scanning module 430 may also be configured to, if a virus is found, output information that a virus is found upon monitoring based on the client satisfying the first switching condition.

Preferably, the virus scanning device 400 of this embodiment may further comprise a fourth scanning module 450 configured to scan the second scanning items in the client at the first scanning speed based on the client satisfying a third switching condition.

In some implementations, the third switching condition may for example include at least one of the followings: a virus is found in the first scanning items; and a frequency for scanning virus is higher than a first predetermined value.

Preferably, the virus scanning device 400 of this embodiment may further comprise a third scanning module 460 configured to stop scanning and output information that no virus is found in the client based on a second switching condition being satisfied.

In some implementations, the second switching condition may be: no virus found in the first scanning items; and a historical infection rate of the second scanning items being lower than a third predetermined value.

Preferably, the virus scanning device 400 of this embodiment may further comprise a fifth scanning module 470 configured to scan all items in the client at the first scanning speed based on a virus being found upon monitoring.

Figure 5:
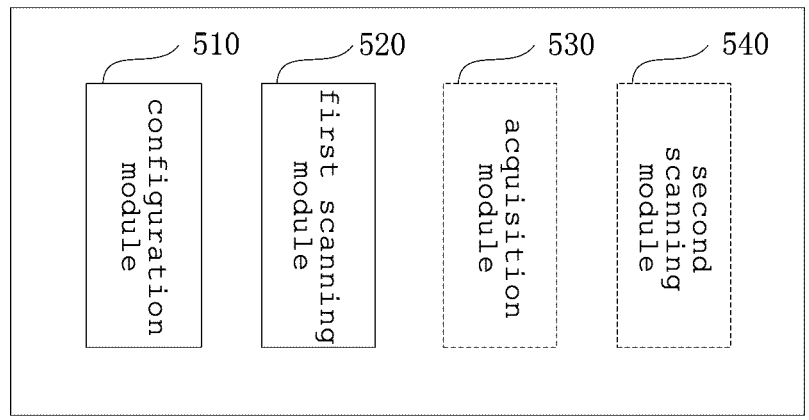
FIG. 5 illustrates a schematic structural diagram of a virus scanning device according to another embodiment of the present application.

FIG. 5 illustrates a schematic structural drawing of a virus scanning device 500 according to another embodiment of the present application.

As illustrated in FIG. 5, the virus scanning device 500 comprises a configuration module 510 and a first scanning module 520.

The configuration module 510 is configured to configure scanning items in the client. The scanning items include first scanning items and second scanning items. Here, the first scanning items may be interpreted as items being subjected to virus scanning preferentially in the client.

The first scanning module 520 is configured to initiate a first scan on the first scanning items in the client, the first scanning has a first scanning speed.

In some implementations, the configuration module 510 is configured to configure the scanning items in the client by the following manners.

First, the configuration module 510 may be configured to count a ratio of items infected by a virus in a plurality of clients. Here, the plurality of clients are clients connected with the same server via a network. Next, assigning the items having the ratio higher than a predetermined ratio as the first scanning items, and remaining items (items having the ratio being not higher than the predetermined ratio) as the second scanning items.

Preferably, the virus scanning device 500 of the present embodiment may further comprise an acquisition module 530 and a second scanning module 540.

The acquisition module 530 is configured to acquire a scanning result of the first scan. The second scanning module 540 is configured to initiate a second scan on the second scanning items in the client on the basis that the client satisfies a preset condition. Here, the second scan has a second scanning speed, and the first scanning speed is higher than the second scanning speed.

In one implementation, the preset condition may be: no virus found in the first scanning items, a frequency for scanning virus at which the first scan is initiated not exceeding a predetermined frequency and a historical infection rate of the second scanning items being lower than a predetermined infection rate.

Figure 6:
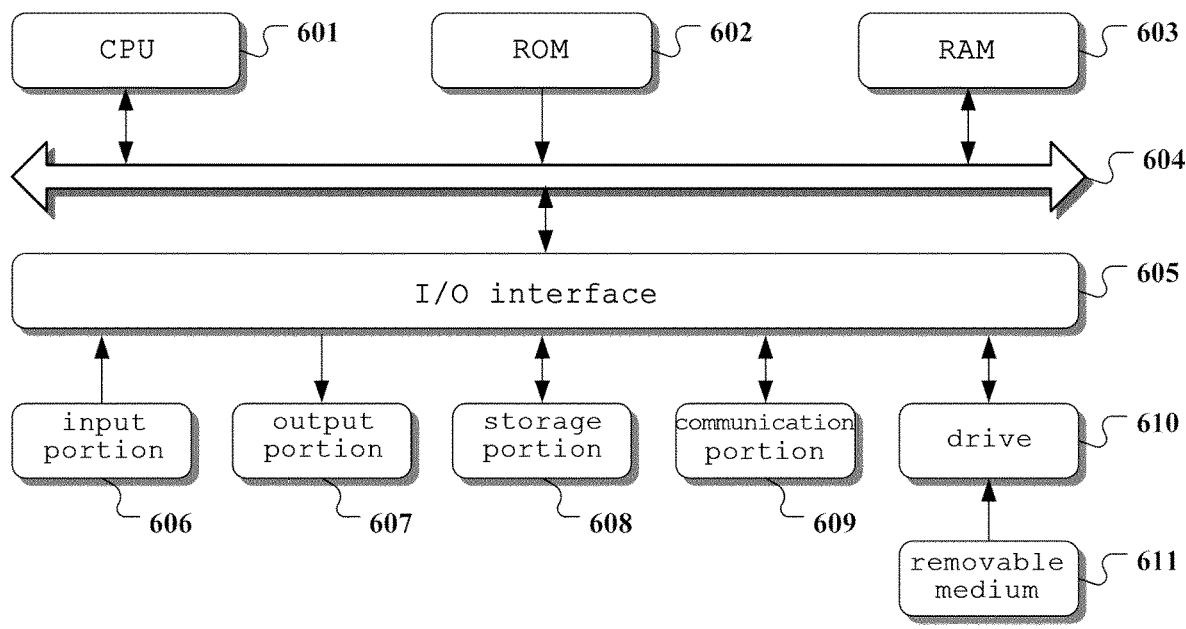
FIG. 6 illustrates a schematic structural diagram of a computer system 600 for implementing terminal devices or a server of an embodiment of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a detection unit, an ascertaining module, a first scanning module, a second scanning module, where the names of these units or modules are not considered as a limitation to the units or modules. For example, the ascertaining module may also be described as "a module for ascertaining first scanning items in a client."

In another aspect, the present application further provides a computer readable storage medium. The computer readable storage medium may be the computer readable storage medium included in the apparatus in the above embodiments, or a stand-alone computer readable storage medium which has not been assembled into the terminal. The computer readable storage medium stores one or more programs. The programs are used by one or more processors to execute the method for inputting formula described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A method for scanning virus, comprising:
   ascertaining first scanning items in a client device based on a determination to perform an intelligent scan;
   scanning the first scanning items at a first scanning speed; and
   scanning second scanning items in the client device at a second scanning speed based on the client device satisfying a first switching condition, the second scanning items comprising all remaining items except the first scanning items in the client device, the first scanning items having higher probabilities of containing viruses than the second scanning items;

wherein the first scanning speed is higher than the second scanning speed;

wherein the first switching condition includes:
    at least one of: no virus being found in the first scanning items; a frequency for scanning virus not exceeding a first predetermined value; or a historical infection rate of the second scanning items being lower than a second predetermined value.

2. The method according to claim 1, wherein, after scanning the first scanning items at the first scanning speed, the method further comprises:
    outputting information that no virus is found in the client device based on the client device satisfying the first switching condition.

3. The method according to claim 1, wherein, after scanning the second scanning items in the client device at the second scanning speed, the method further comprises:
    if a virus is found, outputting information that a virus is found upon monitoring.

4. The method according to claim 1, further comprising:
    stopping scanning, and outputting information that no virus is found in the client device based on a second switching condition being satisfied;
    wherein the second switching condition includes at least one of: no virus being found in the first scanning items; or a historical infection rate of the second scanning items being lower than a third predetermined value.

5. The method according to claim 1, further comprising:
    scanning the second scanning items in the client device at the first scanning speed based on a third switching condition being satisfied.

6. The method according to claim 5, wherein the third switching condition includes at least one of the following:
    a virus is found in the first scanning items; or
    a frequency for scanning virus is higher than a first predetermined value.

7. The method according to claim 1, further comprising:
    scanning all items in the client device at the first scanning speed on the basis that a virus is found upon monitoring.

8. The method for scanning virus according to claim 1, wherein the ascertaining a first scanning items in a client comprises at least one of the following:
    assigning a currently operating item in the client as the first scanning items; and
    counting a historical number of virus infection occurrences for items in the client, and considering items having the historical number of virus infection occurrences being higher than a predetermined number of infection occurrences as the first scanning items.

9. A method for scanning virus, comprising:
    counting a ratio of scanning items in a client device infected by a virus in a plurality of client devices, the plurality of client devices being connected to a server via a network;
    assigning the scanning items having the ratio higher than a predetermined ratio as first scanning items in the client device, and remaining scanning items as second scanning items in the client device;
    initiating a first scan on the first scanning items in the client device, the first scan having a first scanning speed;
    acquiring a scanning result of the first scan; and
    initiating a second scan on the second scanning items in the client device on the basis that the client device satisfies a preset condition, the second scan having a second scanning speed, the first scanning speed being higher than the second scanning speed;

wherein the preset condition includes:
    at least one of: no virus being found in the first scanning items in the client device; a frequency for scanning virus at which the first scan being initiated not exceeding a predetermined frequency; or a historical infection rate of the second scanning items being lower than a predetermined infection rate.

10. A device for scanning virus, comprising:
    at least one processor; and
    a memory storing instructions, the instructions when executed by the at least one processor, cause the at least one processor to perform operations, the operations comprising:
    ascertaining first scanning items in a client device based on a determination to perform an intelligent scan;
    scanning the first scanning items at a first scanning speed; and
    scanning second scanning items at a second scanning speed in the client device based on the client device satisfying a first switching condition, the second scanning items including all remaining scanning items except the first scanning items in the client device, the first scanning items having higher probabilities of containing viruses than the second scanning items;

wherein the first scanning speed is higher than the second scanning speed, and wherein the first switching condition includes:
    at least one of: no virus being found in the first scanning items; a frequency for scanning virus not exceeding a first predetermined value; or a historical infection rate of the second scanning items being lower than a second predetermined value.

11. The device according to claim 10, wherein the operations further comprise:
    after scanning the first scanning items at the first scanning speed, outputting information that no virus is found in the client device based on the client device satisfying the first switching condition.

12. The device according to claim 10, wherein the operations further comprise: if a virus is found, outputting information that a virus is found upon monitoring based on the client device satisfying the first switching condition.

13. The device according to claim 10, wherein the operations further comprise:
    stopping scanning, and outputting information that no virus is found in the client device based on a second switching condition being satisfied;
    wherein the second switching condition comprises at least one of:
        no virus being found in the first scanning items; or a historical infection rate of the second scanning items being lower than a third predetermined value.

14. The device according to claim 10, wherein the operations further comprise:
    scanning the second scanning items in the client device at the first scanning speed based on a third switching condition being satisfied.

15. The device according to claim 14, wherein the third switching condition includes at least one of the following:
    a virus is found in the first scanning items; or
    a frequency for scanning virus is higher than a first predetermined value.

16. The device according to claim 10, wherein the operations further comprise:
   scanning all items in the client device at the first scanning speed on the basis that a virus is found upon monitoring.

17. The device for scanning virus according to claim 10, wherein the ascertaining a first scanning items in a client comprises at least one of the following:
   assigning a currently operating item in the client as the first scanning items; and
   counting a historical number of virus infection occurrences for items in the client, and considering items having the historical number of virus infection occurrences being higher than a predetermined number of infection occurrences as the first scanning items.

18. A device for scanning virus, comprising:
   at least one processor; and
   a memory storing instructions, the instructions when executed by the at least one processor, cause the at least one processor to perform operations, the operations comprising:
   counting a ratio of scanning items in a client device infected by a virus in a plurality of client devices, the plurality of client devices being connected to a server via a network;
   assigning the scanning items having the ratio higher than a predetermined ratio as first scanning items in the client device, and remaining scanning items as second scanning items in the client device;
   initiating a first scan on the first scanning items in the client device, the first scan having a first scanning speed;
   acquiring a scanning result of the first scan; and
   initiating a second scan on the second scanning items in the client device on the basis that the client device satisfies a preset condition, the second scan having a second scanning speed, the first scanning speed being higher than the second scanning speed;
   wherein the preset condition includes:
      at least one of: no virus being found in the first scanning items in the client device; a frequency for scanning virus at which the first scan being initiated not exceeding a predetermined frequency; or a historical infection rate of the second scanning items being lower than a predetermined infection rate.

19. A non-transitory computer readable storage medium in which one or more programs are stored, wherein, when the one or more programs are executed by an apparatus, the apparatus performs:
   ascertain first scanning items in a client device based on a determination to perform an intelligent scan;
   scan the first scanning items at a first scanning speed; and
   scan second scanning items in the client device at a second scanning speed based on the client device satisfying a first switching condition, the second scanning items being all remaining items except the first scanning items in the client device, the first scanning items having higher probabilities of containing viruses than the second scanning items:
   wherein, the first scanning speed is higher than the second scanning speed;
   wherein the first switching condition includes:
      at least one of: no virus being found in the first scanning items; a frequency for scanning virus not exceeding a first predetermined value; or a historical infection rate of the second scanning items being lower than a second predetermined value.

20. A non-transitory computer readable storage medium in which one or more programs are stored, wherein, when the one or more programs are executed by an apparatus, the apparatus performs:
   counting a ratio of scanning items in a client device infected by a virus in a plurality of client devices, the plurality of client devices being connected to a server via a network;
   assigning the scanning items having the ratio higher than a predetermined ratio as first scanning items in the client device, and remaining scanning items as second scanning items in the client device;
   initiating a first scan on the first scanning items in the client device, the first scan having a first scanning speed;
   acquiring a scanning result of the first scan; and
   initiating a second scan on the second scanning items in the client device on the basis that the client device satisfies a preset condition, the second scan having a second scanning speed, the first scanning speed being higher than the second scanning speed;
   wherein the preset condition includes:
      at least one of: no virus being found in the first scanning items in the client device; a frequency for scanning virus at which the first scan being initiated not exceeding a predetermined frequency; or a historical infection rate of the second scanning items being lower than a predetermined infection rate.

\* \* \* \* \*